July 24, 1934.     F. E. WOLCOTT     1,967,985
SEAL
Filed Dec. 11, 1931

INVENTOR
FRANK E. WOLCOTT
BY
ATTORNEY.

Patented July 24, 1934

1,967,985

UNITED STATES PATENT OFFICE 1,967,985

SEAL

Frank E. Wolcott, West Hartford, Conn., assignor to The Silex Company, a corporation of Connecticut Application December 11, 1931, Serial No. 580,305

36 Claims. (Cl. 53—3)

My invention relates to seals.

In coffee makers of the type having upper and lower bowls, wherein water in the lower bowl is heated and forced by fluid expansion into the upper bowl, it is necessary to maintain a fluid-tight seal at the juncture between the upper bowl stem and the lower bowl neck during the coffee making operation, while also thereafter enabling the upper bowl to be removed so that the coffee may be dispensed from the lower bowl. It has been the practice heretofore to provide this seal by means of a resilient rubber plug fitted on the upper bowl stem and inaccessible within the passage of the lower bowl neck, or, as in one prior construction, to provide a hollow yieldable seal body of great length which cannot be twisted as necessary to make and break the seal, and which, further, required the upper bowl to be precariously supported at too great a distance above the upper extremity of the lower bowl neck and required not only a long seal body but a correspondingly increased length of upper bowl stem. Prior to my invention, although the lower bowl has been commonly provided with a handle, no handle means of any character has ever been provided on the coffee maker by which the hot upper bowl can be conveniently removed without serious danger of burning the hands, while permitting the bottom of the upper bowl to be located in close proximity to the upper extremity of the lower bowl neck, as is necessary to obtain vertical compactness and to stabilize the upper bowl against tilting.

My invention has for one of its objects to provide an improved seal, and, more particularly, an improved seal of the type adapted to use in connection with glass coffee makers or the like, wherein effective means is provided on the seal by which the upper bowl unit can be conveniently and safely removed while maintaining the highly desirable vertically compact spacing of the bowls. A further object of my invention is to provide an improved coffee maker construction and one having improved means for handling the upper bowl after the completion of the coffee making operation, whereby the removal of the hot bowl is facilitated while minimizing difficulty with burning the hands, and, more specifically, a seal having a heat insulated rigid grasping portion, or handle, located above the upper extremity of the lower bowl neck and extending laterally therebeyond away from the hot glass of both the bowls where it can be safely grasped by the hand, and if necessary, rotated to break the seal and assist in the removal of the upper bowl. These and other objects and advantages of my improved construction will, however, hereinafter more fully appear.

In the accompanying drawing, I have shown for purposes of illustration three forms which my invention may assume in practice.

In the drawing,—

Figure 1:
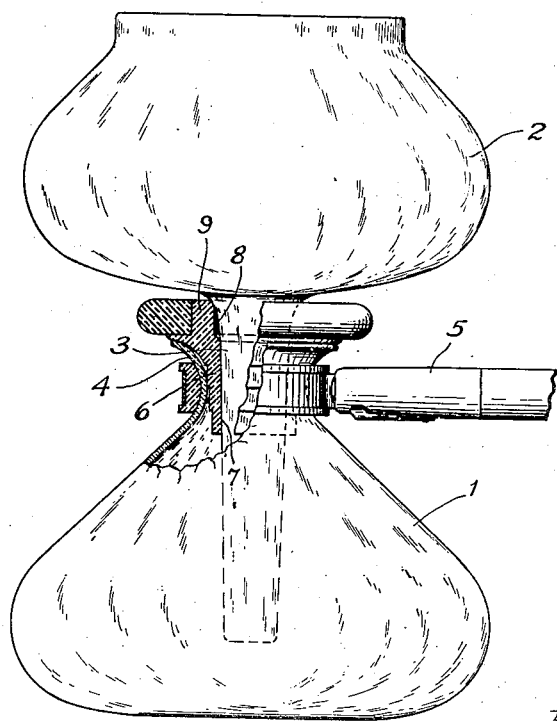
Figure 1 is a side elevation of a coffee maker equipped with my improvement, portions of the lower bowl and seal being broken away to facilitate illustration.

In the form shown in Figures 1 and 2, it will be noted that I have illustrated my invention applied to a coffee maker comprising a usual lower bowl 1 and upper bowl 2 having a tapered stem 3 extending down into the neck 4 of the bowl 1, my improved seal being disposed around the stem 3 and disposed therewith in the neck 4 and having improved means hereinafter described for releasing the seal and lifting off the bowl 2 disposed above the neck 4 and below the body of the bowl 2, while any usual handle 5 is carried on the outside of the neck.

Referring more particularly to my improved seal, it will be noted that the same comprises a body 6, preferably formed of soft, live rubber or other equivalent material and herein also having a stepped lower end. Herein, however, it will be noted that in addition to the usual axial aperture 7 adapted to receive the stem 3, an extension of this aperture is provided. In a preferred construction, this extension is in the form of an enlarged axial aperture 8 provided in an annular upstanding flange or extension 9 extending above the upper end of the seal and formed of the same material as the body of the seal. Also it will be noted that herein the aperture 8 is connected with the aperture 7 by a bevelled portion 10, and that the extension 9 is surrounded by a laterally extending flange portion 11 provided by an annular rim 12 which is in turn above a concavely curved portion 13 at the upper end of the stepped lower end and adapted to extend beyond the rim on the neck 4. It will also be noted that a disc or ring member 14 is seated on the flange 11 so that it engages the latter and surrounds the extension 9 and also extends laterally beyond the rim 12, while having its top substantially flush with the top of the extension 9. This member 14 is preferably formed of such a substance as hard rubber or an equivalent material and suitably attached to the member 6 so that it, in effect, forms an integral part of the plug during use. Herein, this member 14, being of hard rubber, is vulcanized to both of the adjacent portions 9 and 11 of the soft rubber member 6 in such manner as to be permanently connected to the latter. Further it will be noted that this member or disc 14 is effectually insulated by these portions 9 and 11 from the glass of both bowls, the portion 9 serving to provide heat insulation between the disc and the stem 3 of the bowl 2 while the flange 11 serves a similar function between the disc and the upper extremity of the neck 4 of the bowl 1, all in such manner as thus to minimize heat conduction thereto.

Figure 2:
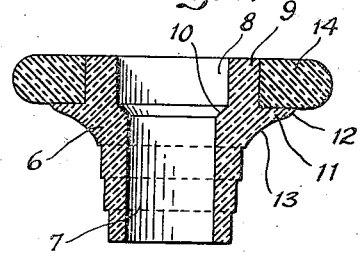
Fig. 2 is an enlarged vertical sectional view of the seal per se.

In the use of my improvement, the seal is placed upon the end of the stem 3 in the position illustrated in Figure 1 wherein the upper end of the stem is disposed in the aperture 8, and the upper surface is, as preferably, slightly spaced from the bottom of the bowl 2. Obviously, due to the provision of the disc 14 and the connection of the same to the portions of the seal 6 in the manner indicated, it is also possible for the seal to be readily rotated as desired during the fitting on operation to facilitate the latter, the large disc being particularly helpful in enabling not only an effective grip to be obtained upon the seal, but in effecting rotation of the latter. During the fitting on operation, it also will be noted that the enlarged aperture 8 reduces the tendency of the rubber of the seal to cling to the tapered stem 3 and thus resist longitudinal movement along the latter, while also facilitating disposition of the seal around the enlarged upper end of the same where the latter tapers into the body of the bowl. Further, when the seal is in place, it will be noted that the upper end of the aperture 8 engages and forms a seal on the stem where it merges into the bowl, in such manner as both to grip the stem at this point and prevent the entry of dirt or the like into the enlarged aperture 8. Further, the lower axial aperture 7 of smaller diameter still serves to provide effective positioning means on the tapered stem when in the proper position thereon, and cooperates with the seal provided at the upper end of the aperture 8 in providing both spaced sealing means at the opposite ends of the seal body and an intermediate sealing means or portion, herein above the lower end of the aperture 7, which cooperates with the sealing portion at the lower end of the aperture 7 to form a continuous wide sealing band which reenforces the external sealing means against collapse during twisting. Thus, it will be noted that, despite the provision of the enlarged aperture means 8, the three sealing areas provide effective sealing means, while, due to the intermediate sealing means, the seal body is enabled to rotate effectively as a unit relative to the stem during insertion thereon or removal therefrom, or bodily with the stem when making or breaking sealing engagement between the external sealing portion of the seal body and the neck of a lower bowl. After the seal has been thus positioned on the stem, it ordinarily remains thereon and the latter is inserted in the neck 4 in a usual manner and remains therein during the coffee making operation with the member 6 then acting in a well known manner as a sealing means between the neck and stem. During this coffee making operation it will also be evident that the member 6 being of soft rubber, and the portions 9 and 11 thereof effectually insulating the disc 14 from the stem 3 and neck 4 respectively by preventing contact of this disc with the hot glass at any point, the disc 14 will always be kept cool enough to be handled. After the coffee making operation, when it is desired to remove the upper bowl 2, this can be very readily accomplished in my improved construction by merely grasping between the thumb and fore finger the hard and readily holdable disc 14 and lifting the same and the bowl 2, with a slight twisting movement, if necessary. Thus, during the separation or removal of the then hot bowl 2, it is possible to eliminate the necessity for grasping or in any way touching the same, while the bowl 1 can of course be held during this process by grasping the handle 5 thereof. It will, moreover, be evident that the enlarged aperture 8 will also facilitate removal of the seal from the stem 3, should this be desired, and that the disc 14 will provide an effective means for grasping and rotating the seal during this operation.

Figure 3:
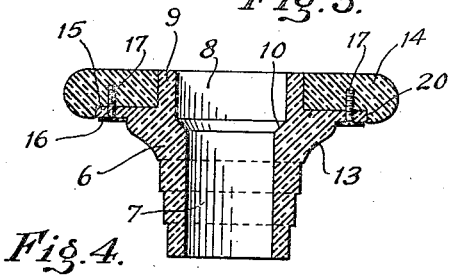
Fig. 3 is a similar view of a modified form of seal.
Figure 4:
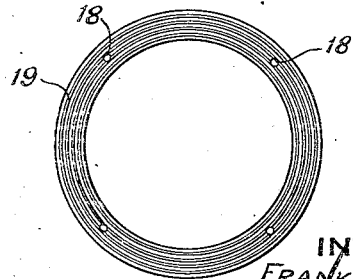
Fig. 4 is a detail plan view of the holding plate shown in Fig. 3.

In Figures 3 and 4 I have shown a modified construction wherein, while using members 6 and 14 of substantially the same construction as heretofore described, these members are connected to one another in a different manner. More particularly, it will be noted that in this construction, the member 6 is provided with a flange 15, generally corresponding to the flange 12, which is clamped to the member 14 by suitable connecting means, such for example as an underlying plate 16 and co-operating attaching means 17, herein, as preferably, in the form of screws extending through suitable radially spaced apertures 18 in the plate and through the flange 15 into the member 14. As in a preferred construction, this plate 16 is provided with a grooved or otherwise suitably roughened surface 19 engageable with the flange 15, and both the flange and this plate are seated in an annular recess 20 provided in the under surface of the member 14 around the axis thereof, so that the lower surface of the plate 16 is substantially flush with the lower surface of the member 14 surrounding the recess 20. Moreover, it will be noted that the flange 15 is of substantially the diameter of the recess 20, while the plate 16 is of slightly smaller diameter than the flange, so that the latter serves to insulate the plate, and the spaced screws 17 are the only connection between the plate and the member 14. By reason of this modified construction, it is not only possible to substitute a new member 6 whenever desired, but further possible to utilize either hard rubber, or other substances, such as catalin or karolith, for example, which may be more decorative in appearance, and can be attached by the metal plate to the soft rubber body 6 without vulcanizing. It will, of course, also be understood that my improved connecting means for the seal and disc, just described, are not limited to use with a member 6 having on its lower end sealing means of the stepped type shown in Figure 3 but may be used with sealing members having any desired form of sealing means.

Figure 5:
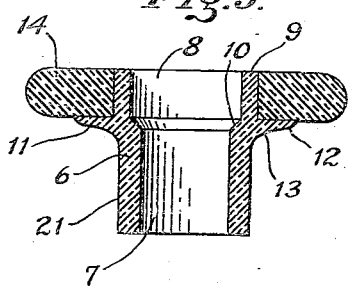
Fig. 5 is a view similar to Figure 2 but showing a further modified construction.

In Figure 5 I have illustrated a further modified construction which is especially adapted to use in connection with bowls of the type having relatively straight necks as distinguished from outwardly curved necks of the type illustrated in Figure 1. In this construction it will be noted that the member 6 is of substantially the same construction previously described, save that it has a substantially uniform cylindrical soft rubber sealing portion 21 on its lower end, and that the lateral and upstanding soft rubber flanges 11 and 9 are slightly thinner than in the form previously described. In such a construction of bowl and seal, wherein a substantially greater amount of twisting or rotating of the member 6 is necessary in order to release the seal than is the case in the construction shown in the preceding figures, it is found that, due to my improved construction, the member 14 may be rotated as necessary to free the same from the neck without separating or tearing the same from the soft rubber of the member 6, while the member 14 is, of course, kept cool in such manner as to be readily handled.

It will be noted that, although a seal of the present invention, having the same aperture dimensions, offers no greater resistance to rotation over the bowl stem during the fitting on or removing operations than the seals hitherto in use, by reason of the provision of the large diameter, rigid releasing flange, manipulation of the seal, and particularly rotation thereof on the stem, is possible to a degree never before known, and with greater ease. This is due to the fact that the rigid nature of the flange makes it possible to grasp the flange forcibly without transmitting the gripping pressure to the resilient seal, whereas with the prior art seals the pressure exerted on the seal to rotate it was largely expended in compressing the seal against the bowl stem and thereby making separation more difficult. Further, while avoiding this objectionable compression, the large diameter of the flange, compared with the outside diameter of the usual seal, also increases the leverage through which the force applied on the flange acts on the seal to enable an operator to apply a greatly increased force to the seal to urge it into position on the stem or to remove it from the stem. Attention is further directed to the marked reduction in clinging of the resilient material to the stem obtainable by the provision of the enlargement at the upper end of the stem aperture which not only reduces the area capable of clinging, but also minimizes compression of the resilient material upon the stem. This enlargement also markedly facilitates the insertion of the seal upon a tapered stem having a relatively abrupt enlargement at its upper end, while permitting the enlarged aperture to be closed by this enlargement on the stem. It will also be evident that, as a result of the lateral and upright flanges on the upper end of the resilient material, it is possible to fix the releasing flange very securely thereto as, for example, by vulcanizing in such manner as to produce a very rugged long-lived construction. These and other advantages of my improved construction will, however, be apparent to those skilled in the art.

While I have in this application specifically described three forms which my invention may assume in practice, it will be understood that these forms of the same are shown for purposes of illustration, and that the invention may be modified and embodied in various other forms without departing from its spirit or the scope of the appended claims.

What I claim as new and desire to secure by Letters Patent is:—

1. A single stopple sealing member for coffee makers comprising a single stopple body having an axial coffee maker stem receiving and sealing passage and having an external sealing portion of resilient material for sealing the neck of a coffee maker bowl and disposable therein or removable therefrom while a stem is in said passage, said body also having thereon above said sealing portion a handle member projecting laterally beyond a portion of the periphery of said sealing portion and fixed to the latter for bodily rotary movement in reverse directions with said sealing portion when inserting said body on a stem or making or breaking sealing engagement of said sealing portion in the neck of a coffee maker bowl.

2. A single stopple sealing member for coffee makers comprising a single stopple body having an axial coffee maker stem receiving and sealing passage and having an external sealing portion of resilient material for sealing the neck of a coffee maker bowl and disposable therein or removable therefrom while a stem is in said passage, said body also having thereon above said sealing portion a handle flange projecting laterally beyond the periphery of said sealing portion and fixed to the latter for bodily rotary movement in reverse directions with said portion when inserting said body on a stem or making or breaking sealing engagement of said sealing portion in the neck of a coffee maker bowl, said flange having an outer periphery forming a grasping portion.

3. A coffee maker sealing member comprising a tubular body composed of resilient material having a laterally extended heat insulating flange at its upper end, and a releasing flange member for said sealing member surrounding the opening therein above said flange and fixed to said sealing member for bodily movement therewith.

4. A coffee maker sealing member comprising a tubular body composed of resilient material having a laterally extended heat insulating flange adjacent its upper end and having an aperture extended axially therethrough, and a releasing flange member for said sealing member surrounding the body of the latter and above and fixed to the flange thereof for bodily movement therewith and projecting laterally substantially beyond the margin of said flange.

5. A coffee maker sealing member comprising a tubular body composed of resilient material having an aperture extended axially therethrough, and a releasing flange member fixed on the top of said sealing member for bodily movement therewith and having an aperture therethrough that is coaxial with but of greater diameter than the aperture of said sealing member.

6. A coffee maker sealing member comprising a tubular body of yielding material having an external sealing portion and an axial aperture therethrough, said aperture being enlarged at the upper end of said body, and a releasing member of relatively unyielding material fixed to the upper end of said body and surrounding said enlarged aperture.

7. A seal for coffee makers or the like having an axial aperture therein, a disc carried on the upper end of said seal and having an axial aperture coaxial with said aperture and its periphery extending laterally beyond the periphery of the upper end of the seal, and a plate engageable with said seal and having connecting means for connecting the latter to said disc.

8. A seal for coffee makers or the like having an extension thereon and a lateral flange, a disc receiving said extension and engageable by said flange and having its periphery extending laterally beyond the periphery of said flange, a plate engageable with said flange, and means for clamping said flange between said plate and disc.

9. A seal for coffee makers or the like having an axial aperture therein and an external sealing area, a releasing disc fixed to the upper end of said seal against rotation relative thereto and having an axial aperture coaxial with said aperture and its periphery extending laterally beyond the periphery of the upper end of the seal above the sealing area thereon, heat insulating means on said seal projecting upwardly into the aperture in said disc, and laterally projecting heat insulating means for said disc projecting laterally beneath the latter and also on said seal.

10. A seal of soft rubber for coffee makers or the like having an axial aperture therein and a laterally extending flange on its upper end, and a releasing member of hard rubber carried on the upper end of said seal and vulcanized to the latter and projecting laterally beyond the top of the flange on said seal.

11. A seal for coffee makers or the like comprising an axially apertured disc of hard material providing a rigid grasping portion, and an axially apertured sealing member of soft material connected to said disc against rotation relative thereto having axially and laterally projecting portions forming a heat insulating means for said disc and having a sealing portion depending below said disc.

12. A seal for coffee makers or the like having a reduced axial extension thereon and an axial aperture therein, a releasing disc surrounding and within the vertical limits of said extension and projecting laterally beyond the top of the unreduced portion of said seal, said seal being of soft material and said disc being of harder material and fixed against rotation relative to said seal and forming a unit therewith.

13. A seal for coffee makers or the like having an axially apertured soft rubber body and provided with an external sealing portion on its lower end, and having a wide and axially apertured releasing flange of hard rubber vulcanized to the top of said portion and projecting laterally beyond the latter, the axial aperture in said flange being larger than the aperture in said soft rubber body.

14. A seal for coffee makers or the like having an axially apertured soft rubber body and provided with an external sealing portion on its lower end, and having a wide releasing flange of hard rubber vulcanized to the top of said portion and projecting laterally beyond the latter, the axial aperture in said flange being larger in diameter than the aperture in said body, and said soft rubber body having upwardly and laterally extending flanges inside and below said hard rubber flange.

15. A sealing member for coffee makers or the like having an external sealing portion and an axial aperture therethrough provided with an end aperture of larger diameter forming an extension of said aperture, and also having a laterally extending external releasing flange fixed to said seal against rotation relative thereto and disposed below the open end of said extension and above the upper end of said sealing portion.

16. The combination with a seal for coffee makers or the like having an external sealing portion and an axial aperture therein, an extension on its upper end having an enlarged aperture forming an extension of said aperture, and a flange below said extension, of a releasing disc surrounding said upper extension, fixed to said seal against rotation relative thereto, and seated on said flange and protruding laterally therefrom.

17. A coffee maker sealing member comprising a body of resilient material of sufficient rigidity to inhibit longitudinal folding of its upper end and to rotate as a unit at its opposite ends having an external sealing portion and an axial aperture extended therethrough in which the stem of a coffee maker bowl is adapted to be fitted, said sealing member having provision for facilitating insertion of said stem in said aperture including an end aperture of larger diameter at the upper end of said body forming an extension of said first mentioned aperture and receiving an enlarged portion of said stem.

18. A coffee maker sealing member comprising a body of resilient material of sufficient rigidity to inhibit longitudinal folding of the upper end thereof while effecting rotation of the opposite ends of said body substantially as a unit, said body having external sealing means comprising an external sealing portion, and internal sealing means having an axial aperture and communicating axial aperture means of larger diameter for facilitating assembly of said body on the stem of a coffee maker upper bowl or removal of the same from the latter, said internal sealing means having means for sealing said stem adjacent the opposite ends of said body, and also having sealing means intermediate said last mentioned sealing means and disposed on the opposite wall of said body from said external sealing portion reenforcing the wall of the latter and rotatable with said external and internal sealing means as a unit.

19. A coffee maker sealing member comprising a body of resilient material of sufficient rigidity to inhibit longitudinal folding of the upper end thereof while effecting rotation of the opposite ends of said body substantially as a unit, said body having external sealing means comprising an external sealing portion, and internal sealing means having an axial aperture and communicating axial aperture means of larger diameter for facilitating assembly of said body on the stem of a coffee maker upper bowl or removal of the same from the latter, said internal sealing means having means for sealing said stem adjacent the opposite ends of said body, and also having sealing means intermediate said last mentioned sealing means and disposed on the opposite wall of said body from said external sealing portion reenforcing the wall of the latter and rotatable with said external and internal sealing means as a unit, and said intermediate sealing means and one of said longitudinally spaced sealing means cooperating to present a wide sealing band adjacent one end of said body.

20. A coffee maker sealing member having an external sealing portion and an axial stem aperture, and means for facilitating insertion of a stem in said seal comprising an end aperture of larger diameter forming an extension of said first mentioned aperture, and a rigid releasing member surrounding said aperture of larger diameter.

21. The combination with a coffee maker seal having an axial aperture, an external stepped sealing portion, and a lateral flange above the latter, of a laterally projecting releasing flange surrounding and fixed to said sealing member and disposed above said flange and projecting laterally substantially beyond the latter.

22. The combination with a coffee maker seal having an axial aperture, an external stepped sealing portion, and a lateral flange above the latter, of a laterally projecting releasing flange fixed to said sealing member and disposed above said flange and projecting laterally substantially beyond the latter, said seal also having an enlarged extension of said axial aperture at the upper end of the latter in the vicinity of said releasing flange.

23. In a coffee maker, a lower bowl having a neck, an upper bowl having a stem in said neck, a seal having soft heat insulating material on said stem and in said neck engaging both of the same, and a rigid releasing member between said neck and upper bowl forming a unit with said seal and heat insulated from both said stem and neck by said material.

24. In a coffee maker, a lower bowl having a neck, an upper bowl having a stem in said neck, an insulating seal for said bowls on said stem and in said neck, and a releasing member between said neck and upper bowl forming a unit with said seal and projecting laterally beyond the upper extremity of the neck of the lower bowl, said seal having means for spacing said releasing member apart both from said stem and said neck.

25. In a coffee maker, a lower bowl having a neck, an upper bowl having a stem in said neck, an axially apertured seal on said stem in said neck, a releasing disc disposed between said neck and upper bowl and connected to said seal to form a unit therewith, and means on said unit to space apart and heat insulate said disc from said stem and neck.

26. In a coffee maker, a lower bowl having a neck, an upper bowl having a stem receivable in said neck, an axially apertured seal receivable on said stem, a releasing disc disposable between said neck and upper bowl and connected to said seal to form a unit therewith, said disc having an axial aperture and said seal having a disc receiving portion disposed within said aperture and also having an enlargement of the upper end of its axial aperture in the vicinity of said disc receiving portion for facilitating its insertion on said stem.

27. In a coffee maker, a lower bowl having a neck, an upper bowl having a stem in said neck, an axially apertured seal on said stem in said neck, and a releasing disc disposed between said neck and upper bowl and connected to said seal to form a unit therewith, said unit having aperture means for facilitating the insertion of the same on said stem and sealing the upper end of the axial aperture in said seal when the latter is in operative position on said stem.

28. In a coffee maker including a lower bowl having a neck and an upper bowl having a stem in said neck, the combination of a seal comprising a tubular body, a releasing flange surrounding the tubular body of and fixed to said seal for bodily movement therewith, and heat insulating means interposed between said releasing flange and the neck of the lower bowl comprising an integral outstanding flange on said seal.

29. In a coffee maker including an upper bowl having a depending stem and a lower bowl having an upstanding bowl supporting neck adapted to receive said stem, the combination of an annular seal located between contiguous parts of said neck and stem, and a seal releasing member surrounding the upper end of said seal and fixed to said seal for bodily movement therewith, said seal having a laterally extending flange which extends beneath and is interposed between said releasing member and said neck, and also having an upwardly extending flange which is interposed between said releasing member and said stem.

30. In a coffee maker including a bowl having a tubular stem, the combination of a seal formed of yielding material having an axial aperture therethrough in which said stem is adapted to be fitted, and a releasing flange member for said seal formed of a relatively unyielding material and fixed to said seal for bodily movement therewith, said seal having provision for reducing the rate of heat transfer from said stem to said releasing flange member including an enlarged recess at its upper end which is coaxial with and forms an extension of said aperture and which provides an air space between said stem and releasing member.

31. In a coffee maker, a lower bowl having a neck, an upper bowl having a stem in said neck, an axially apertured seal of soft material on said stem in said neck, a releasing disc of hard material disposed between said neck and upper bowl and connected to said seal to form a unit therewith, means on said seal for heat insulating said disc from said neck, and means on said seal for heat insulating said disc from said stem, said seal having provision for facilitating the insertion thereof on said stem and sealing the axial aperture in said seal when the latter is in operative position on the stem.

32. In a coffee maker, the combination with a lower bowl having an upstanding tubular neck terminating in a pouring lip, and an upper bowl having a stem depending through said neck into said lower bowl, of a fluid sealing member comprising a single stopple of yielding material fitted on said stem at the bowl end of the latter, said sealing member having an upper portion and having a lower sealing portion disposed in said neck, said sealing member being rotatable as a unit by said upper portion with said lower portion in frictional engagement with said neck without substantial angular displacement of said upper and lower portions relative to each other, and a handle member for said upper bowl rotatable with said stem and sealing member and disposed above the extremity of said neck and extended laterally a substantial distance away from said neck constituting means for rotating said stem and sealing member bodily as a unit in said neck to make or break the seal and for lifting said upper bowl.

33. In a coffee maker, the combination with a lower bowl having an upstanding tubular neck, the passage through which has a portion of minimum diameter, and an upper bowl depending through said neck and into said lower bowl, of a fluid sealing member comprising a single stopple on said upper bowl seated within said neck having an upper tapered supporting portion and a lower less abruptly tapered sealing portion, each of said portions comprising a plurality of external annular sealing surfaces of diminishing diameter in the direction of the lower end of said body disposable at different heights in necks of different diameter, one of which surfaces engages said neck passage in a continuous annular sealing band at or above its portion of minimum diameter irrespective of variations from the intended neck diameter, and a grasping member carried by and rotatable as a unit with said sealing member while the latter is in frictional engagement with said neck and disposed above and extended laterally beyond said supporting portion and beyond the upper extremity of said neck.

34. In a coffee maker, the combination with a lower bowl having an upstanding tubular neck terminating in a flared lip, and an upper bowl having a stem depending through said neck and into said lower bowl, of a fluid sealing member fitted on the stem of said upper bowl and seated within said neck having a tapered sealing portion comprising a plurality of external annular sealing surfaces normally disposed within the vertical limits of the sealing area of said neck and of diminishing diameter in the direction of its lower end, one of which surfaces engages said neck passage in a narrow continuous sealing band, and a grasping member fixed to said sealing member above said sealing portion adjacent the upper extremity of said neck and extended laterally beyond the lip of said bowl neck, said grasping member being spaced apart by an interposed portion of said sealing member from said neck and also spaced at its inner periphery from said stem.

35. In a coffee maker, the combination with a lower bowl having an upstanding neck, the inner wall of which presents a throat having a portion of minimum diameter and terminates in a pouring lip, and an upper bowl having a tubular stem depending therefrom and adapted to extend through said neck into said lower bowl, of a fluid sealing member fitted on said stem and seated in said neck having a sealing portion comprising a plurality of annular stepped surfaces providing a series of sealing edges of diminishing diameter in the direction of its lower end, one of which surfaces engages said neck in a narrow continuous band at or above its portion of minimum diameter to form a seal, said sealing member also having a grasping flange located above said sealing portion closely adjacent and extended laterally beyond the lip of said lower bowl neck and said sealing member and flange being rotatable without substantial relative rotation upon rotation of said flange.

36. In a coffee maker, the combination with a lower bowl having an upstanding tubular neck terminating in a pouring lip, the passage through which provides a sealing area, and an upper bowl having its bottom located adjacent the extremity of said lower bowl neck and having a stem depending through said neck and into said lower bowl, of a fluid sealing member fitted on said upper bowl stem and having a sealing portion comprising a plurality of annular sealing surfaces of diminishing diameter normally disposable within the vertical limits of the sealing area of said neck, and one of which surfaces engages said neck passage in a continuous annular sealing band, said fluid sealing member also having a grasping flange fixed thereto adjacent its upper end and disposed between the bottom of said upper bowl and said pouring lip and extended laterally a substantial distance from said lip, and said sealing member and flange being rotatable without substantial relative rotation upon rotation of said flange.

FRANK E. WOLCOTT.